Nov. 13, 1934.     J. JONAS     1,980,409
FREQUENCY CONVERTING SYSTEM
Filed June 3, 1932     4 Sheets-Sheet 1

Nov. 13, 1934.   J. JONAS   1,980,409
FREQUENCY CONVERTING SYSTEM
Filed June 3, 1932   4 Sheets-Sheet 4

Fig. 4

Inventor
J. Jonas
by G.J.D.Slein
Attorney

Patented Nov. 13, 1934

1,980,409

UNITED STATES PATENT OFFICE 1,980,409

FREQUENCY CONVERTING SYSTEM

Julius Jonas, Baden, Switzerland, assignor to Aktiengesellschaft Brown Boveri & Cie., Baden, Switzerland, a joint-stock company of Switzerland Application June ?, 1932, Serial No. 615,108
In Germany June 4, 1931

14 Claims. (Cl. 172—281)

This invention relates to improvements in systems for changing the frequency of an alternating current supply line to a different frequency desired in an alternating current distribution line by the use of an electric current rectifier of the metallic vapor arcing type, and more particularly to a system such as above described capable of supplying inductive or capacitive current consuming circuits without being the seat of disturbance which would occur if one of the systems known heretofore was used for this purpose.

When an alternating current supply line of one frequency is connected with an alternating current distribution line to be supplied with current of another frequency through electric current rectifiers of the metallic vapor arcing type, two rectifiers or two sets of anodes in a single rectifier must be provided to operate alternately during each half wave of the alternating current distribution line potential. The anodes of the rectifier, or the rectifiers, must then be so controlled that only one set of anodes is operative during each half wave for the reason that the cathode of one rectifier, when two rectifiers are used, is connected with the neutral point of a transformer secondary winding supplying the anodes of the other rectifier. The arc paths in the two rectifiers are thus electrically connected in series and, in the event of their being energized simultaneously, will establish a short circuit between the two transformer secondary windings through a loop circuit connecting the rectifier and their transformers, appearing in the drawings in the shape of a figure eight. When only one rectifier is used, with two sets of anodes therein, it is necessary to so control the operation of the anodes as to avoid flashovers of the arc from the anodes of one set of anodes to the anodes of the other set of anodes. A system such as above indicated operates without objection as long as the load on the distribution line is purely ohmic resistance for the reason that the current in the distribution line is in phase with its voltage, so that at no time will the current be carried by anodes of one rectifier while anodes of the other rectifier are made operative by the action of their respective control electrodes. If the load to be supplied is, however, inductive, the last of the anodes operating in sequence in one rectifier will continue to carry current at the time the potential on the control electrodes associated with the anodes of the other rectifier is such as to permit such anodes to pick up the arc. Under such conditions the potential on the anode of the first series, which continues to carry current, is reversed and opposes the current, which is nevertheless maintained by the induced E. M. F. in the load circuit. The voltage received by the anode from its transformer winding may be considered as negative with respect to the load circuit; the voltage simultaneously received by the first anode of the second rectifier from its winding tends to reverse the current in the load circuit, and can therefore also be considered as negative. Both rectifiers thus tend to operate in parallel with respect to the load circuit. As long as the winding voltage of the first rectifier is the higher, the current will continue to flow from its anodes. When the voltage of the anode of the second rectifier becomes the higher by twice the value of the arc drop, a transfer of the load current will occur from the first rectifier to the second. During such transfer, however, the two rectifiers will operate simultaneously for a short period of time, thereby short circuiting their transformers through the "figure 8" circuit. Unless the two anodes considered receive voltages equal in magnitude and in exact phase opposition, a damaging short circuit current will circulate in the "figure 8" circuit and will prevent the proper operation of the system.

It is, therefore, an object of the present invention to provide a frequency converting system employing an electric current rectifier of the metallic vapor arcing type having different sets of anodes operating in sequence in such manner that inductive loads can be carried without causing short circuits in portions of the system.

Another object of the present invention is to provide a frequency converting system employing an electric current rectifier of the metallic vapor arcing type having different sets of anodes operating in sequence in such manner that the current carrying period of any anode of one set is prolonged only for a period during which this prolongation will not permit the occurrence of short circuits in the system.

Another object of the present invention is to provide a frequency converting system employing an electric current rectifier of the metallic vapor arcing type having different sets of anodes operating in sequence, the anodes being associated with control electrodes which are themselves controlled simultaneously and in the same manner to permit current flow in the load circuit regardless of the phase relation of current flow in the system, thus permitting the system to supply either an inductive or capacitive load.

Another object of the present invention is to provide a frequency converting system employing an electric current rectifier of the metallic vapor arcing type having different sets of anodes operating in sequence, the anodes being associated with control electrodes which are themselves so controlled that the first operating anode of each set will pick up the arc only when current is relinquished by an anode of the other set in phase opposition thereof.

Another object of the present invention is to provide a frequency converting system employing an electric current rectifier of the metallic vapor arcing type having different sets of anodes operating in sequence, the anodes being associated with control electrodes which are themselves so controlled that the current carried by any anode whose winding voltage has become negative, is transferred to the anode in phase opposition with respect to the anode of the other set made operative by its control electrode.

Another object of the present invention is to provide a frequency converting system employing an electric current rectifier of the metallic vapor arcing type having different sets of anodes operating in sequence, the anodes being associated with control electrodes which are themselves so controlled that the transfer of energy back from the distribution line to the supply line is made possible by the action of the control electrodes.

Another object of the present invention is to provide a frequency converting system employing an electric current rectifier of the metallic vapor arcing type having different sets of anodes operating in sequence, the anodes being associated with control electrodes which are themselves so controlled that each anode is made operative in sequence during two periods in phase opposition during each cycle of the voltage in the load circuit.

Another object of the invention is to provide a frequency converting system employing an electric current rectifier of the metallic vapor arcing type having a plurality of sets of anodes operating in sequence in response to a potential impressed on control electrodes associated with the anodes in such manner that the curves illustrating the combined potentials of the anodes approximate a sine curve.

Objects and advantages other than those above set forth will be apparent in the following description when read in connection with the accompanying drawings in which.

Figure 1:
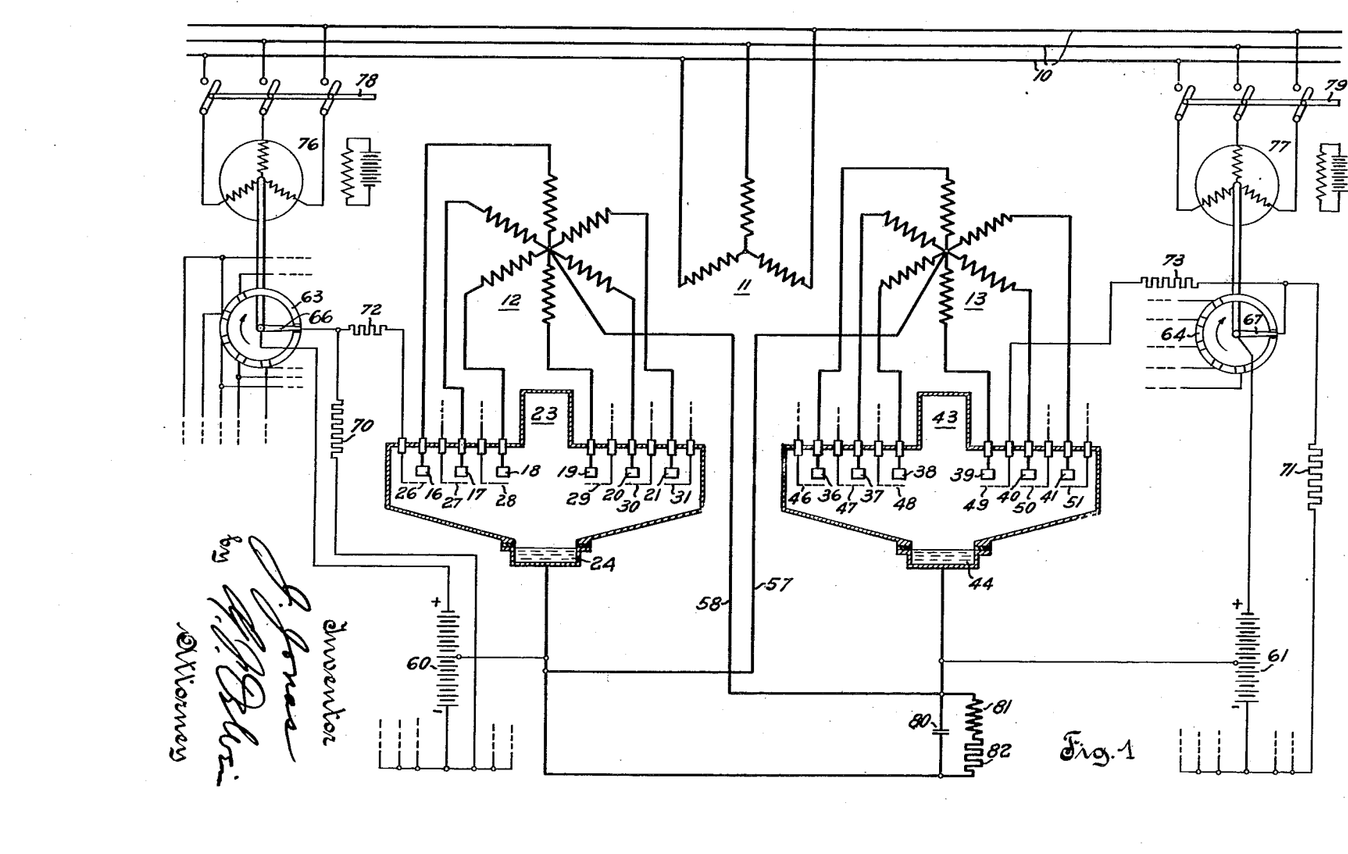
Fig. 1 diagrammatically illustrates one embodiment of the present invention in which two electric current rectifiers of the metallic vapor arcing type are supplied with alternating current of one frequency and supply alternating current of another frequency to a load circuit, the anodes of the rectifiers having associated therewith control electrodes which determine the moment in the cycle of alternating current supply potential at which each anode may start carrying current.

Referring more particularly to the drawings by characters of reference, the reference numeral 10 designates a polyphase alternating current supply line of any given frequency. The primary winding 11 of a transformer is connected with the alternating current supply line 10 and in inductive relation with two secondary windings 12 and 13, each divided into a plurality of star-connected phase sections. The phase sections of the transformer secondary winding 12 are severally connected with anodes 16, 17, 18, 19, 20 and 21 of an electric current rectifier of the metallic vapor arcing type generally designated by 23 and having a cathode 24 of vaporizable material such as mercury. Each of the anodes of the rectifier 23 is provided with a control electrode 26, 27, 28, 29, 30 and 31 respectively, on which a potential is impressed to control the moment in the cycle of the alternating current supply potential at which the associated anode will be operable to start carrying current as will be described hereinafter. The phase sections of the transformer secondary winding 13 are severally connected with the anodes 36, 37, 38, 39, 40 and 41 of the electric current rectifier of the metallic vapor arcing type generally indicated at 43 and having a cathode 44 of vaporizable material such as mercury. Each of the anodes of the rectifier 43 is associated with a control electrode 46, 47, 48, 49, 50 and 51 respectively, for the purpose of controlling the moment at which the associated anode will be operable to pick up the arc as above mentioned. The cathode 24 is connected with the neutral point of the transformer secondary winding 13, by a conductor 57, and the cathode 44 is connected with the neutral point of the transformer secondary winding 12 by a conductor 58, thus forming a circuit which is generally in the form of the numeral eight. It will be understood that each of the rectifiers 23 and 43 is provided with means for striking an arc and for maintaining such arc within each of the rectifiers as is well known in the electric current rectifying art and, therefore, not shown or described herein.

A potential is impressed on each of the control electrodes of both rectifiers from suitable sources such as the batteries 60 and 61 respectively through distributor switches each having a plurality of contacts 63 or 64 and brushes 66 or 67. The negative terminals of the batteries are continuously connected through resistances as at 70, 72 and 71, 73 respectively with the circuits of the control electrodes. The contacts 63 and 64 of the distributor switches are severally continuously connected with the several control electrodes through resistances as at 72 and 73. The positive terminals of the batteries are connected with the several control electrodes through the brushes 66 or 67 of the distributor switches depending on the position of such brushes relative to the location of the several contacts. The brushes 66, 67, are preferably rotated by means such as synchronous motors 76, 77, connected with the alternating current supply line 10 through switches 78, 79. Synchronous motors 76, 77 are chosen with a suitable number of poles and provided with suitable gears or other rigid transmission means for operating the brushes 66, 67, to make two revolutions for every cycle of the voltage in the load circuit, thus energizing each control electrode once during each positive half cycle and once during each negative half cycle of the load circuit voltage. An intermediate potential point of each of the batteries 60, 61, is connected with the cathodes 24, 44. A positive or negative potential with respect to the cathode potential may thus be impressed on the control electrodes through the distributor switches. The cathodes 24 and 44 of the rectifiers are connected with a load which may be either inductive or capacitive as indicated by the capacity 80, the reactance 81 and the ohmic resistance 82. The load circuit is supplied with current at a frequency different from that of the supply line 10 as will be seen from the following description of the operation of the system.

Figure 2:
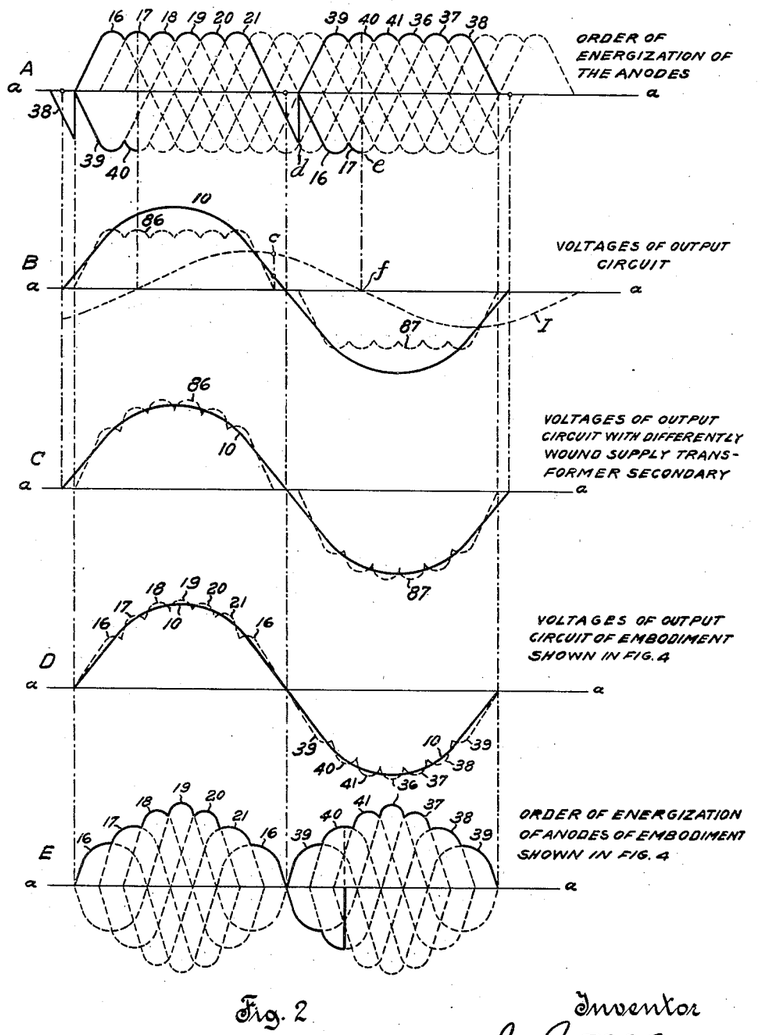
Fig. 2 is a diagram illustrating the potential relations of the several anodes operating in sequence in the several rectifiers or of different sets of anodes operating in a same rectifier.

To facilitate comprehension of the system above described, reference is now made to Fig. 2 of the drawings which is divided into portions A, B, C, D and E for purposes of ease in referring thereto. The sine curves shown in dotted lines represent the order in which potential is impressed on the respective anodes of the several rectifiers and are designated by the numerals applied to the anodes in Fig. 1. The portion A of Fig. 2 thus illustrates the order in which the anodes of the several rectifiers would normally pick up the arc maintained within the rectifiers provided the load on the system was merely resistive and not reactive. In portion B of Fig. 2, curves 86 and 87 illustrate the actual voltage curve impressed on the load circuit, either directly as in the embodiment of Fig. 1, or through an output transformer 86, 87, 88 as in the embodiment of Fig. 3. Curve 10 illustrates the voltage curve which it is desired to approximate in the load circuit by means of voltages shown or curves 86 and 87, and curve I illustrates a current flowing through an inductive load supplied by the system. The portion C of Fig. 2 illustrates the relations of the potential curves 86 and 87 and the curve 10 of portion B when the phase sections of the supply transformer secondary windings 12 and 13 are wound in such a manner as to secure closer approximation of curve 10 and curves 86 and 87 as will be explained hereinafter.

Assuming that an arc has been struck and is being maintained in each of the rectifiers 23 and 43 as is usual, closure of switches 78 and 79 will start motors 76 and 77 which rotate brushes 66 and 67 respectively, thereby causing the application of a positive potential from the batteries 60 and 61 to each of the control electrodes of the rectifiers in sequence. When the load 80, 81, 82 is reactive, assuming that the brushes 66 and 67 are in the position shown in the drawings, a positive potential is impressed on the control electrode 26 thus permitting the anode 16 to pick up the arc. All other control electrodes in both rectifiers have a negative potential impressed thereon with the exception of the control electrode 49 associated with the anode 39 of the rectifier 43. But at that moment the current, which lags behind the voltage, is still negative and is therefore carried by rectifier 43 so that anode 16, although capable of carrying current, remains idle. Further, rotation of brush 66 applies a positive potential to control electrodes 27, 28, 29, 30 and 31 in sequence thus permitting anodes 17, 18, 19, 20 and 21 to pick up the arc as the potential impressed on such anodes rises above the potential at that moment of the preceding anode. Further rotation of brush 67 in synchronism with brush 66 also causes application of a positive potential relative to the cathode on the control electrodes 50, 51, 46, 47 and 48 in sequence, but the anodes associated therewith being at the moment negative relative to the cathode potential cannot pick up the arc, with the exception that anodes 39 and 40 carry current during completion of the negative half cycle thereof, by a process to be explained hereinafter. When the current reaches zero for starting on a positive half cycle, control electrode 27 is receiving a positive potential relative to the potential of cathode 24 from brush 66. The corresponding anode 17 thus is able to pick up the arc. Successive applications of positive potential to control electrodes 28, 29, 30, 31 permits the arc to be transferred to anodes 18, 19, 20, 21 as is well known in metallic vapor arc rectifier operation.

At point c on portion A of Fig. 2, the voltage given to anode 21 by transformer secondary winding 12 tends to bring anode 21 to a potential below that of cathode 24. The inductive E. M. F. of load reactance 81, however, is at that moment rising in value and sufficient for overbalancing the voltage of winding 12, so that anode 21 remains above cathode potential and continues to carry current.

At point d, brushes 66 and 67 have accomplished a complete rotation, and control electrodes 26 and 49 again have a positive potential impressed thereon. Anode 16 is thus again capable of taking current and, receiving from transformer winding 12 a less negative voltage than anode 21, offers less resistance than anode 21 to the flow of current maintained by the inductive E. M. F. of load inductance 81. Current is thus transferred from anode 21 to anode 16. At the same time anode 39 is operable for carrying current but, having the same voltage as anode 16 with respect to the output circuit, will not take the current. Transformer windings 12 and 13 are short circuited by anodes 16 and 39, but no short circuit current is produced as anodes 16 and 39 receive voltages opposing each other in the figure eight circuit.

At point e, control electrodes 27 and 50 receive a positive potential from brushes 66 and 67. Current is again transferred from anode 16 to anode 17 as explained above.

At point f the output current passes through zero and is reversed to become conventionally negative, and can therefore no longer be carried by rectifier 23, which can carry current only in one direction. The current is then taken by anode 40 whose control electrode is positive with respect to cathode 44, and which is therefore able to take the arc, the current then flowing in the normal direction for rectifier 43. Further rotation of brush 66 will apply positive potentials to the control electrodes 29, 30 and 31 without effect, the associated anodes being impressed with potential negative relative to the potential of cathode 24, but rotation of brush 67 will apply positive potentials to the control electrodes 51, 46, 47 and 48 in the sequence enumerated and will permit the associated anodes to pick up the arc in the same sequence. After the voltage impressed on anode 38 reaches zero, said anode continues to carry current by a process similar to that described above in relation to anode 21. Consideration of portions A, B and C of Fig. 2 will show that all six anodes in each rectifier 23, 43, pick up the arc during each alternate half cycle of the alternating current wave in the load circuit. If conversion is to be obtained from supply line current at 50 cycles to a load current at 16⅔ cycles, to secure proper sequence of arc pick up by the anodes, the contacts of each of the switches are spaced 40 degrees from each other excepting for the contacts connected with control electrodes 26, 27, and 49, 50, there being 80 degrees between each of such pairs of contacts, and the contacts connected with control electrodes 31, 26 and 48, 49 which are spaced at distances of 120 degrees.

If the load 80, 81, 82 is exclusively resistance, anodes 21 and 39 will no longer carry current past their point of zero voltage, at which points the current will be transferred to anodes 39 and 16, respectively.

Figure 3:
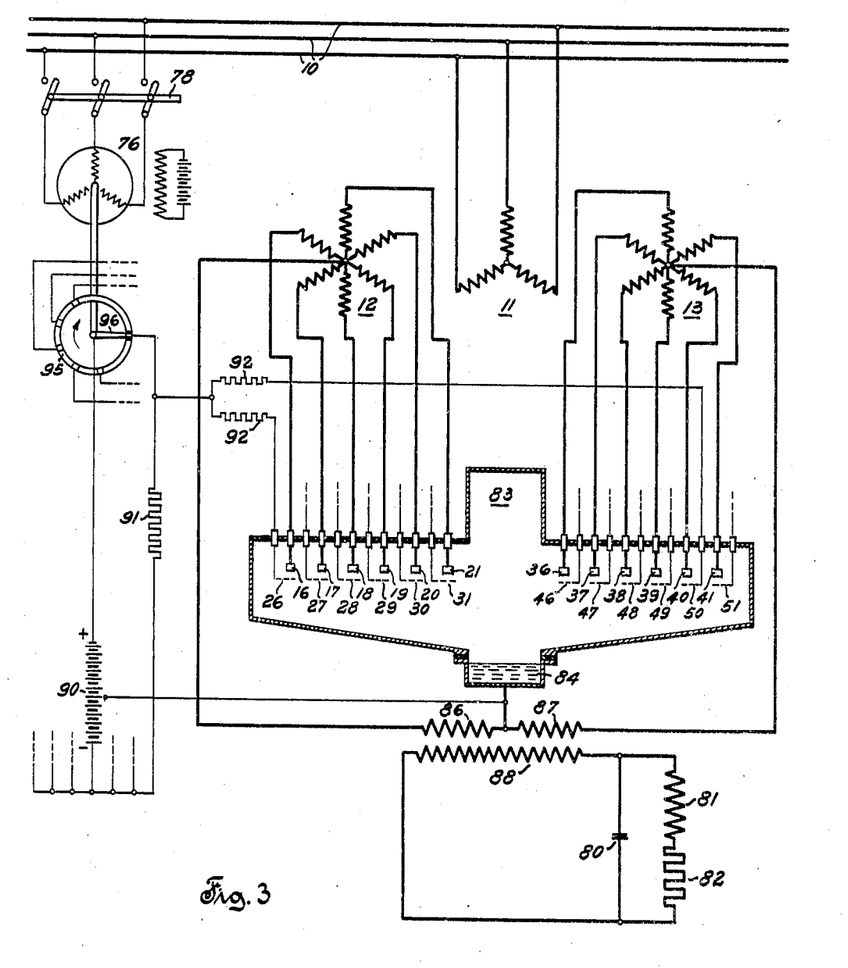
Fig. 3 diagrammatically illustrates a modified embodiment of the invention in which two sets of anodes are arranged within a single electric current rectifier.

A frequency converting system such as above described is very much simplified if only a single rectifier as shown at 83 in Fig. 3, with a single cathode as at 84 is used. It is, however, desirable that the rectifier be provided with the same number of anodes as are shown in Fig. 1 for both rectifiers and that the anodes be connected through the transformer comprising primary winding 11 and secondary windings 12 and 13 with the polyphase supply line 10. The neutral points of the transformer secondary windings are connected through the primary windings 86 and 87 of an output transformer with the cathode 84, such primary windings and a second winding 88 forming a transformer by which the load 81, 82 is supplied from the rectifying system.

Each of the anodes 16, etc. and 36, etc. are again each provided with a control electrode 26, etc. and 46, etc. as in Fig. 1. Since the energization of all control electrodes is now effected in relation to the potential of a single cathode 84, it is now possible to simplify the control by connecting the control electrodes of the two sets of anodes in pairs in the order in which the arc is to be picked up in each set between the associated anodes, which order is as follows: 26 and 50, 27 and 51, 28 and 46, 29 and 47, 30 and 48, 31 and 49. The anodes associated with each pair of control electrodes above mentioned are with phases of opposite polarity of the secondary windings 12 and 13. Due to the connection of the control electrodes in pairs it is necessary to provide only one source of potential such as the battery 90 having an intermediate point thereof connected with the cathode 84 and the negative terminal thereof connected with each pair of the control electrodes through the resistances 91 and 92. The positive terminal of the battery 90 is connected intermittently with the control electrodes by a distributor switch comprising a series of contacts 95 arranged in a circle and a brush 96 rotating over the contacts, by which means a positive potential may be impressed upon each pair of the control electrodes in sequence. The brush is again preferably driven by a synchronous motor 76 connected with the line 10 and operating at such speed as to make two complete revolutions of the brush 96 for each cycle of the frequency of the load circuit 80, 81, 82 and 88.

The operation of the system shown in Fig. 3 is similar to that above described for the system shown in Fig. 1 with the exception that the current flows from the common cathode 84 through the windings 86 and 87 during alternate half cycles of the frequency of the load circuit, inducing an alternating current of the desired frequency in secondary winding 88. Consideration of portion B of Fig. 2 will show that the curves 86 and 87 illustrating the potentials present in windings 86 and 87 and transmitted to winding 88 do not approximate the sine curve 10 illustrating the potential which it is desired to obtain in the load circuit. A closer approximation of curves 86 and 87 to curve 10 may be obtained as shown in portion C of Fig. 2 if the several phases of the supply transformer secondary windings 12 and 13 are wound with different numbers of turns. Thus the transformer phases supplying pairs of anodes such as the anodes 16 and 21, 17 and 20, and 18 and 19 will have the same number of turns but the number of turns of the phase sections supplying the anodes above considered together will be different to obtain the different potential amplitudes shown in portion C of Fig. 2. The transformer secondary winding phases supplying anodes 36 to 41 are similarly arranged in pairs and the windings have different numbers of turns as above described and as may be seen from curve 87. The number of turns for the several pairs of phase sections of the transformer secondary windings is preferably as the sine of 40 degrees is to the sine 60 degrees is to the sine of 80 degrees, i. e., in the proportions .665:.88:1.

Figure 4:
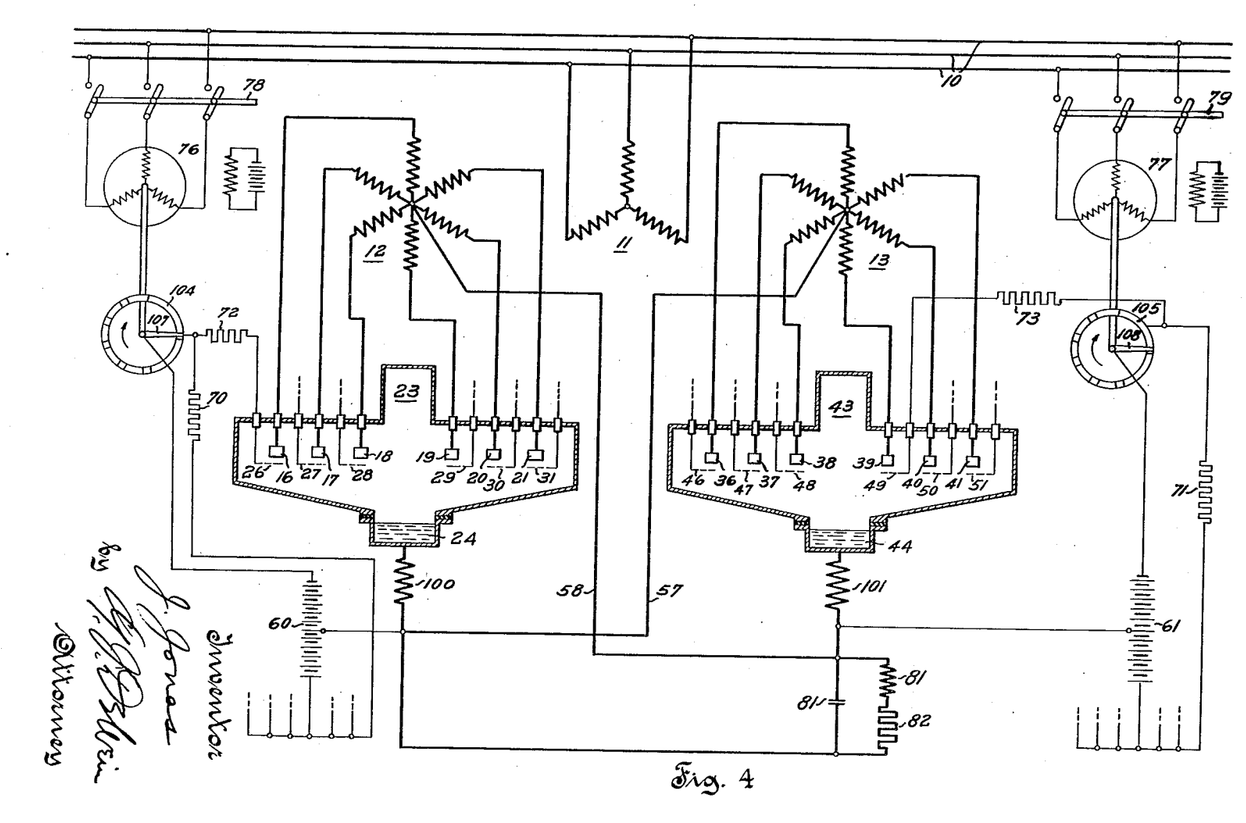
Fig. 4 diagrammatically illustrates another embodiment of the invention similar to that shown in Fig. 1 with the exception that the controlled electrodes associated with the anodes of each rectifier are controlled in a manner such as to minimize voltage surges in the output or load circuit upon change of operation from one set of anodes to the other set of anodes.

Reference to portions A, B and C of Fig. 2 will show that a voltage surge takes place in the output circuit as illustrated particularly by the full lines extending below the line $a$—$a$ and by the fact that the points of intersection of the curves 86 and 87 with the line $a$—$a$ do not coincide. Such surge is possible because the back E. M. F. due to the inductive load supplied is not sufficient to overbalance the voltage of the last anode in operation in the sequence of the anodes in the first rectifier. Under some conditions it may be desirable or even necessary to eliminate such voltage surges, which result may be accomplished by the embodiment shown in Fig. 4 which is the same as that shown in Fig. 1, except for the use of reactances 100 and 101 which are connected with the cathodes 24 and 44, the construction of the control switches for the control electrodes associated with the anodes of the two rectifiers and the design of the supply transformer secondary windings with different numbers of turns to produce potentials of different amplitudes on the anodes, e. g. anodes 17 and 21; 18 and 20 are supplied from phases having the same number of turns for each case. Anode 16 is supplied with potential at a lower amplitude and anode 19 is supplied with potential of a higher amplitude than any of the others as may be seen from section E of Fig. 2.

Each of the distributor switches, comprising a series of contacts 104 or 105 and a brush 107 or 108, are arranged to connect the positive terminal of the battery 60 or 61 with the anodes of the rectifiers in sequence dependent upon rotation of the brushes by the motors 76 and 77, operating in synchronism and in phase as described with reference to Fig. 1. The contacts connected with the anodes operating first in each of the sequences of anodes are extended over a portion of the periphery of each of the switches which causes the control electrodes to be positively energized in the following sequences: 26, 27, 28, 29, 30, 31, 26 and 49, 50, 51, 46, 47, 48, 49. Each of the anodes of the respective series first operating thus also operates at the end of each half cycle of the alternating current load potential. With the exception of the repeated operation of one anode in each of the sequences, i. e., the same anode operating first and last, the operation of the system described is similar to that described with relation to Fig. 1. The result of such repeated operation of one of the anodes in each sequence is that each output half wave is made up of seven instead of six waves of different amplitude and the neutral point of the curves coincide as may be seen in portion D of Fig. 2 in which curves 16 and 39 intersect on the mean cathode potential line a—a. It will be seen that the curves illustrating the several anode voltages coincide substantially with curve 10 illustrating the potential which it is desired to obtain in the load circuit, it being understood that the several phase sections of the supply transformer secondary windings have a different number of turns as above described.

Portion E of Fig. 2 illustrates how the voltage surge d, shown by the full lines below line a—a in portion A of Fig. 2, are avoided by the use of the reactances 100 and 101. The full line curves in portion E above the line a—a illustrate the order in which the positive potentials and the magnitude of the positive potentials are impressed on the several anodes and show that the anodes 39 and 40 have positive potentials impressed thereon before anode 16 has dropped the arc at the end of the series of anodes operating in the one rectifier. It will be seen that the full line curves below the line a—a are a much closer approximation to a sine curve than previously which is due to the elimination of the voltage peak indicated at d in portion A of Fig. 2.

It will be understood that the systems described may be used either for conversion from a higher to a lower frequency and vice versa and that the direction of energy flow is not dependent on the direction in which the valve action in the rectifiers takes place. The control of the potentials on the control electrodes will remain the same in both cases and regardless of the frequency to be converted or the frequency to be obtained. The systems shown in the present application are particularly adapted for conversion from polyphase current at fifty cycles to single phase current at sixteen and two-thirds cycles, but any other frequency may be converted in any ratio merely by changing the number of anodes, the number of transformer secondary phase sections, the number of control electrodes, etc. It is to be noted that the arrangement of the contacts and the speed of the switch brushes in the control electrode circuits will vary with the frequency to be converted.

Although but a few embodiments of the present invention have been illustrated and described, it will be understood that various changes and modifications may be made therein without departing from the spirit of the invention or the scope of the appended claims.

It is claimed and desired to secure by Letters Patent:

1. In a system for converting alternating current of one frequency into alternating current of another frequency, electric current rectifying means comprising a plurality of groups of anodes, and a plurality of control electrodes severally associated with said anodes, an alternating current input circuit connected with said anodes and supplying current to said means, an alternating current output circuit connected with and supplied from said means, means connected with and operable to continuously impart to each of said control electrodes potential of such sign and magnitude as to prevent initiation of flow of current through said rectifier means by way of said anodes, and means connected with and operable to sequentially impress momentarily potential simultaneously on the said control electrodes associated with each of said group of anodes of such sign and magnitude as to permit initiation of flow of current through said rectifier means by way of said anodes.

2. In a system for converting alternating current of one frequency into alternating current of another frequency, electric current rectifying means comprising a plurality of anodes divided into a plurality of groups, a plurality of control electrodes severally associated with said anodes, an alternating current input circuit connected with said anodes and supplying current to said means, an alternating current output circuit connected with and supplied from said means, means connected with and operable to continuously impart to each of said control electrodes potential of such sign and magnitude as to prevent flow of current through said rectifier means by way of said anodes, means connected with and operable to sequentially impress momentarily potential simultaneously on the said control electrodes associated with each said group of anodes of such sign and magnitude as to permit initiation of flow of current through said rectifier means by way of said anodes, the last said means being operable to cause the last said potential to be continually impressed on said control electrodes at such rate and for such duration as to cause said rectifier means to supply current to said output circuit at a predetermined frequency relative to the frequency of the current supplied to said rectifier means by way of said anodes from said input circuit.

3. In a system for converting alternating current of one frequency into alternating current of another frequency, a plurality of electric current rectifiers each comprising a cathode, a plurality of anodes, and a plurality of control electrodes associated respectively with said anodes, an alternating current input circuit connected with and supplying said anodes, an alternating current output circuit connected with and supplied from said cathodes, means connected with and continuously imparting to the said control electrodes of each said rectifier potential more negative than the potential of the cathode thereof, and means comprising distributor switches operable to sequentially and continually impress momentarily potential simultaneously on the said control electrodes of each said rectifier more positive than the potential of the cathode thereto thereby control initiation of flow of current between said anodes and cathode of the respective rectifiers in dependence upon the sign and magnitude of the potential impressed on the anodes thereof.

4. In a system for converting alternating current of one frequency into alternating current of another frequency, a plurality of electric current rectifiers each comprising a cathode, a plurality of anodes, and a plurality of control electrodes associated respectively with said anodes, an alternating current input circuit connected with and supplying said anodes, an alternating current output circuit connected with and supplied from said cathodes, means including sources of control current connected with and continuously imparting to said control electrodes of each said rectifier potentials more negative than the potential of the cathode thereof, and means including said sources of control currents connected with and operable to sequentially impress momentarily potential simultaneously on the said control electrodes of each said rectifier more positive than the potential of the cathode thereof to thereby control initiation of flow of current between the anodes and cathode of the respective ones of said rectifiers in dependence upon the potentials impressed upon the anodes thereof.

5. In a system for converting alternating current of one frequency into alternating current of another frequency, a pair of electric current rectifiers each comprising a cathode, a plurality of anodes, and a plurality of control electrodes severally associated with said anodes thereof, an alternating current input circuit, means comprising a transformer having a pair of secondary windings each divided into a plurality of star-connected phase displaced sections, the phase sections of each said winding being severally connected with the said anodes of a different one of said rectifiers to supply current thereto from said circuit, the cathode of each of said rectifiers being connected with the star-point connection of the said winding connected with the other of said rectifiers, an alternating current output circuit connected with the cathodes of said rectifiers to be supplied with current therefrom to a reactive load, sources of control current connected with and continuously imparting to each of said control electrodes of each of said rectifiers potential more negative than the potential of the cathode thereof, distributor switch means having connections and being operable to sequentially connect said sources of control current momentarily and simultaneously with the control electrodes of each of said rectifiers to thereby sequentially impress momentarily potential simultaneously on the said control electrodes of each of said rectifiers of sign and magnitude more positive than the potential of the cathode thereof, and means for so operating said switch means as to cause the last said potential to be continually impressed on said electrodes at such rate as to cause said rectifiers to supply current to said output circuit at a predetermined frequency relative to the frequency of the current supplied to said rectifiers by said input circuit.

6. In a system for converting alternating current of one frequency into alternating current of another frequency, a plurality of electric current rectifiers each comprising a cathode, a plurality of anodes, and a plurality of control electrodes associated respectively with said anodes, an alternating current output circuit, means comprising a transformer having a plurality of secondary windings each divided into a plurality of star-connected phase-displaced sections, the phase-displaced sections of each said winding being severally connected with the said anodes of a different one of said rectifiers to supply current thereto from said circuit, an alternating current output circuit connected with said cathodes and supplied with current from said rectifiers, a source of control current for each said rectifier, means connecting said sources of current with said control electrodes of each said rectifier to continuously impart thereto potential more negative than the potential of the cathode thereof, distributor switch means operable to sequentially impress momentarily potential of said sources of control current simultaneously on the control electrodes of each said rectifier more positive than the potential of the cathode thereof, and means for operating said switch means to cause the last said potential to be continually impressed on said control electrodes at such rate and for such duration as to cause said rectifiers to supply current to said output circuit at a predetermined frequency relative to the frequency of the current supplied to said rectifiers from said input circuit.

7. In a system for converting alternating current of one frequency into alternating current of another frequency, an electric current rectifier comprising a cathode, a plurality of anodes divided into a plurality of groups, and a plurality of control electrodes severally associated with said anodes, an alternating current input circuit, a transformer comprising a secondary winding divided into a plurality of groups of phase-displaced star-connected sections, the phase-displaced sections of each said group thereof being severally connected with the anodes of a different one of said groups thereof and supplying current thereto from said circuit, an alternating current output circuit supplying a reactive load, means comprising a second transformer having windings connected between said cathode and the star-point connection of each said group of said phase-displaced sections connecting said output circuit with said rectifier to be supplied therefrom, means including a source of control current connected with and continuously imparting to each of said control electrodes potential more negative than the potential of said cathode, means comprising said source of control current and a distributor switch operable to sequentially impress momentarily potential simultaneously on the said control electrodes associated with the anodes of each said group thereof more positive than the potential of said cathode to thereby control initiation of flow of current between said anodes and cathode, and means for operating said switch to cause the last said potential to be continually impressed on said control electrodes at such rate as to cause said rectifier to supply current to said output circuit at a predetermined frequency relative to the frequency of the current supplied from said input circuit.

8. In a system for converting alternating current of one frequency into alternating current of another frequency, electric current rectifying means comprising a plurality of anodes divided into a plurality of groups, a plurality of control electrodes severally associated with said anodes, an alternating current input circuit connected with and supplying said means, an alternating current output circuit connected with and supplied from said means, means connected with and operable to continuously impart to each of said control electrodes potential of such sign as to prevent initiation of flow of current through said rectifier means by way of said anodes, means connected with and operable to sequentially impress momentarily potential simultaneously on each control electrode associated with the anodes of each said group thereof of such sign and magnitude as to permit initiation of flow of current through said rectifier means by way of said anodes, the last said means being operable to cause the last said potential to be continually impressed on each said control electrode a plurality of times during each cycle of said output circuit voltage, whereby current is supplied to said output circuit at a predetermined frequency relative to the frequency of said input circuit.

9. In combination, an alternating current supply circuit of one frequency, an alternating current load circuit of a frequency substantially different from the frequency of said supply circuit, electric valve means comprising a plurality of groups of anodes interconnecting said circuits and forming paths for the flow of energy therebetween, a plurality of control electrodes severally associated with said anodes, means connected with and operable to impart to said control electrodes potential of such sign and magnitude as to prevent initiation of flow of energy between said circuits by way of said anodes, and means connected with and operable to sequentially impress potential simultaneously on said control electrodes associated with each said group of anodes momentarily of such sign and magnitude as to permit initiation of flow of energy between said circuits by way of said anodes.

10. In a system for transmitting energy between alternating current lines, an alternating current line of one frequency, a transformer connected with said line, an electron discharge device having anodes with associated control electrodes and a cathode, the anodes and the cathode of said device being connected with said transformer, an alternating current line of a frequency other than that of the first said line, a transformer connecting the cathode of said device with the second said line, said transformers being interconnected, a source of potential arranged for connection with the control electrodes of said device, and means for controlling the connection of said source with the control electrodes to control the energy flow between said lines.

11. The method of converting alternating current of a given frequency into alternating current of a different frequency by means comprising electron discharge means having anodes divided into two groups and control electrodes severally associated with said anodes and wherein a voltage is applied to said electrodes for controlling the operation of said means, which comprises the step of sequentially varying the voltage simultaneously of the control electrodes of each said group thereof.

12. The method of converting alternating current of a given frequency into alternating current of a different frequency by means comprising electron discharge means having anodes divided into two groups and control electrodes severally associated with said anodes and wherein a voltage is applied to said electrodes for controlling the operation of said means, which comprises sequentially varying the voltage simultaneously of the control electrodes of each said group thereof in such sense and at such recurring moments as to permit the flow of in phase current and reactive current alternately through the anodes of the respective said groups thereof.

13. In apparatus for converting alternating current of a given frequency into alternating current of a different frequency, by electron discharge means comprising a plurality of group of anodes and control electrodes severally associated therewith, the method step of applying potential to said control electrodes of such sign and magnitude as to permit flow of current by way of said anodes, and the method step of sequentially impressing potential simultaneously on said control electrodes of each said group of such sum and magnitude as to permit initiation of flow of current by way of the anodes of either of said groups.

14. In combination with an alternating current circuit of a given frequency, an alternating current circuit of a different frequency, and electron discharge means comprising a plurality of groups of anodes interconnecting said circuits and being operable to convert current supplied from one of said circuits and the supply thereof to the other of said circuits at the frequency thereof, of a plurality of control electrodes severally associated with said anodes, means for applying potential to said anodes of such sign and magnitude as to prevent the flow of current by way of said anodes, and means for sequentially impressing potential simultaneously on said control electrodes of each said group thereof of such sign and magnitude and during such recurring moments relative to the voltages of said circuits as to permit the initiation and continued flow of in phase and reactive current between said circuits.

JULIUS JONAS.

CERTIFICATE OF CORRECTION.

Patent No. 1,980,409.  November 13, 1934.

JULIUS JONAS.

It is hereby certified that error appears in the printed specification of the above numbered patent requiring correction as follows: Page 5, line 74, claim 1, strike out the word "of" first occurrance; and line 124, claim 3. for "there-" read thereof; and that the said Letters Patent should be read with these corrections therein that the same may conform to the record of the case in the Patent Office.

Signed and sealed this 5th day of February, A. D. 1935.

Leslie Frazer (Seal)  Acting Commissioner of Patents.